(12) United States Patent
Crawford et al.

(10) Patent No.: US 12,473,067 B1
(45) Date of Patent: Nov. 18, 2025

(54) SYSTEMS AND METHODS FOR CLASSIFYING AND RESPONDING TO HEADING ERROR IN MARINE PROPULSION

(71) Applicant: Navico Holding AS, Egersund (NO)

(72) Inventors: Christopher Crawford, Bixby, OK (US); Antony Mackenzie, Auckland (NZ)

(73) Assignee: Navico Holding AS, Egersund (NO)

( * ) Notice: Subject to any disclaimer, the term of this patent is extended or adjusted under 35 U.S.C. 154(b) by 144 days.

(21) Appl. No.: 18/453,876

(22) Filed: Aug. 22, 2023

(51) Int. Cl.
*B63H 25/04* (2006.01)
*B63B 79/15* (2020.01)
*B63B 79/30* (2020.01)
*B63B 79/40* (2020.01)
*B63H 21/21* (2006.01)

(52) U.S. Cl.
CPC ............. *B63H 21/21* (2013.01); *B63B 79/15* (2020.01); *B63B 79/30* (2020.01); *B63B 79/40* (2020.01); *B63H 25/04* (2013.01); *B63H 2021/216* (2013.01)

(58) Field of Classification Search
CPC .................... B63H 21/21; B63H 25/04; B63H 2021/216; B63B 79/15; B63B 79/40; B63B 79/30
See application file for complete search history.

(56) References Cited

U.S. PATENT DOCUMENTS

| | | | |
|---|---|---|---|
| 6,507,164 B1 | 1/2003 | Healey et al. | |
| 9,290,256 B1 | 3/2016 | Wireman et al. | |
| 9,966,895 B1 | 5/2018 | Deuel | |
| 11,254,402 B1* | 2/2022 | Poirier | F02D 41/10 |
| 11,260,946 B1* | 3/2022 | Przybyl | B63B 39/061 |
| 11,628,920 B2 | 4/2023 | Karnick et al. | |
| 11,673,633 B1* | 6/2023 | Arbuckle | B63H 21/21 |
| | | | 701/21 |
| 11,971,478 B2* | 4/2024 | Combs | G01S 7/56 |
| 12,060,143 B2* | 8/2024 | Janeczko | B63H 21/17 |
| 2022/0392211 A1* | 12/2022 | Johnson | G06V 10/26 |
| 2024/0158063 A1* | 5/2024 | Kalnins | B60L 58/21 |

OTHER PUBLICATIONS

Skulstad et al. Dead Reckoning of Dynamically Positioned Ships: Using an Efficient Recurrent Neural Network, 2019, IEEE, p. 39-51 (Year: 2019).*

(Continued)

*Primary Examiner* — Mcdieunel Marc
(74) *Attorney, Agent, or Firm* — Andrus Intellectual Property Law, LLP

(57) ABSTRACT

A method of operating a marine drive configured to propel a marine vessel is provided. The method includes operating the marine drive to effectuate a specified heading, measuring a heading of the marine vessel using a heading sensor, and measuring acceleration data of the marine vessel using at least one sensor. The method further includes determining that a heading error between the specified heading and the measured heading exceeds a heading error threshold, classifying the heading error based at least in part on the measured acceleration data during a time period prior to the heading error, and performing a heading error response based on the heading error classification.

24 Claims, 7 Drawing Sheets

(56) References Cited

OTHER PUBLICATIONS

Perera et al. Intelligent Ocean Navigation and Fuzzy-Bayesian Decision/Action Formulation, 2012, IEEE, p. 204-219 (Year: 2012).*
Xia et al., Research on sensor fault diagnosis technology of dynamic positioning vessel based on filter and Support Vector Machine, 2017, IEEE, p. 1285-1291 (Year: 2017).*
Sedova et al., An Autosteering Gear System with a Fuzzy Regulator Adjusted by a Neural Network, 2019, IEEE, p. 197-202 (Year: 2019).*

* cited by examiner

SYSTEMS AND METHODS FOR CLASSIFYING AND RESPONDING TO HEADING ERROR IN MARINE PROPULSION

FIELD

The present disclosure relates to marine drives, and more specifically to detecting, classifying, and/or responding to heading error events, including strike events in which a marine drive or vessel strikes an underwater obstacle or object.

BACKGROUND

Many fishing boats include trolling motors mounted at the bow or stern of the boat, which an operator of the boat may use to propel the boat to a selected fishing spot. Often, the trolling motor is provided in addition to a larger motor, such as an outboard motor, and provides slower speeds than the larger motor, which are desirable for both precise positioning and for fishing while the boat is moving through a waterway. The trolling motor is often part of a trolling motor system that allows the operator to control both the steering and speed of the trolling motor.

The following U.S. Patents provide background information and are incorporated herein by reference, in entirety.

U.S. Pat. No. 6,507,164 is directed to a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameter, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 9,290,256 is directed to a steering system for a trolling motor that includes a mechanical steering system having a mechanical steering input device and a mechanical linkage extending from the mechanical steering input device to a steering shaft of the trolling motor. Movement of the mechanical steering input device causes movement of the mechanical linkage, which in turn causes rotation of the steering shaft. An electromechanical actuation system is provided that is configured to be coupled to the mechanical steering system. A controller is in signal communication with the electromechanical actuation system and provides steering signals thereto. The electromechanical actuation system selectively actuates the mechanical steering system so as to rotate the steering shaft according to the steering signals provided by the controller. A method for steering a trolling motor is also provided.

U.S. Pat. No. 9,966,895 is directed to a method for controlling a trolling motor including a sonar transducer and an electric motor rotating a propeller includes providing a motor controller configured for electrical connection to the electric motor. The motor controller includes a pulse width modulator outputting a PWM signal. A high-side electronic switch is provided between a high-side output of the pulse width modulator and the electric motor and a low-side electronic switch is provided between a low-side output of the pulse width modulator and the electric motor. The electric motor is driven by current transmitted via the high-side electronic switch or the low-side electronic switch in response to the PWM signal. An operating frequency of the PWM signal is selected such that an operating frequency of the sonar transducer is approximately centered between harmonic frequencies of the PWM signal. A spread spectrum switching algorithm reduces a peak noise level of the PWM signal.

U.S. Pat. No. 11,628,920 is directed to a method of controlling a steering system on a marine vessel that includes, in response to receiving a user input to engage a quick steer mode, employing a reduced steering ratio to translate positions of a steering wheel to desired steering angles of a marine drive. A vessel speed of a marine vessel is determined and then compared to a threshold vessel speed. An output limit is determined to prevent the marine vessel from further exceeding the threshold vessel speed while the quick steer mode is engaged. The marine drive is automatically controlled based on the output limit and a steering actuator associated with the marine drive is controlled based on the reduced steering ratio.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure includes a method for operating a marine drive configured to propel a marine vessel. The method includes operating the marine drive to effectuate the specified heading, measuring a heading of the marine vessel using a heading sensor, and measuring acceleration data of the marine vessel using at least one sensor. The method further includes determining that a heading error between the specified heading and the measured heading exceeds a heading error threshold, classifying the heading error based at least in part on the measured acceleration data during a time period prior to the heading error, and performing a heading error response based on the heading error classification.

Another example of the present disclosure includes a marine propulsion system. The system includes a marine drive configured to propel a marine vessel, a heading sensor configured to detect a heading of the marine vessel, at least one sensor used to determine acceleration of the marine vessel along at least one axis, and a control system. The control system is configured to operate the marine drive to effectuate the specified heading, measure a heading of the marine vessel using the heading sensor, measure acceleration data of the marine vessel using the at least one sensor, and determine that a heading error between the specified heading and the measured heading exceeds a heading error threshold. The control system is further configured to classify the heading error based at least in part on the measured acceleration data during a time period prior to the heading error, and perform a heading error response based on the heading error classification.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different systems and methods described herein may be used alone or in combination with other systems and methods.

Closed-loop control algorithms are often utilized to manage the heading of marine propulsion systems, including trolling motor systems or other marine drive systems. In such systems, the control algorithms are configured to utilize feedback data to detect and correct errors in heading to command the steering of the marine drive and drive the error between a commanded heading and an actual heading to zero. The present inventors have recognized that if an obstacle or object (e.g., a stump or log, a rock, the seabed) obstructs the steering of the trolling motor, the control algorithm can end up repeatedly driving the vessel or the marine drive into the obstacle in an attempt to correct the heading. In extreme cases, such behavior can cause mechanical or electrical out-of-bounds conditions that lead to temporary or permanent failures. The present inventors have further recognized that enhanced sensing capabilities on marine vessels (e.g., accelerometers, heading sensors, motor current sensors) can provide useful data to drive controllers that can indicate that object strike events have occurred.

The systems and methods of the present disclosure leverage this data in order to control the steering of marine drives to quickly respond to object strike events and prevent further damage to propulsion systems. In particular, the systems and methods of the present disclosure utilize the data to detect heading errors and determine whether the heading error can be attributed to an object strike event or an environmental-based event, that is, an inability to achieve a commanded heading due to environmental conditions, for example, strong winds or current. If the system determines the heading error is due to an object strike event, the system will not immediately attempt to correct the heading and may notify the operator of the object strike. By contrast, if the system determines that the heading error is due to an environmental-based event, it will continue attempting to correct the heading, because the risk of damage to the system is lower.

Figure 1:
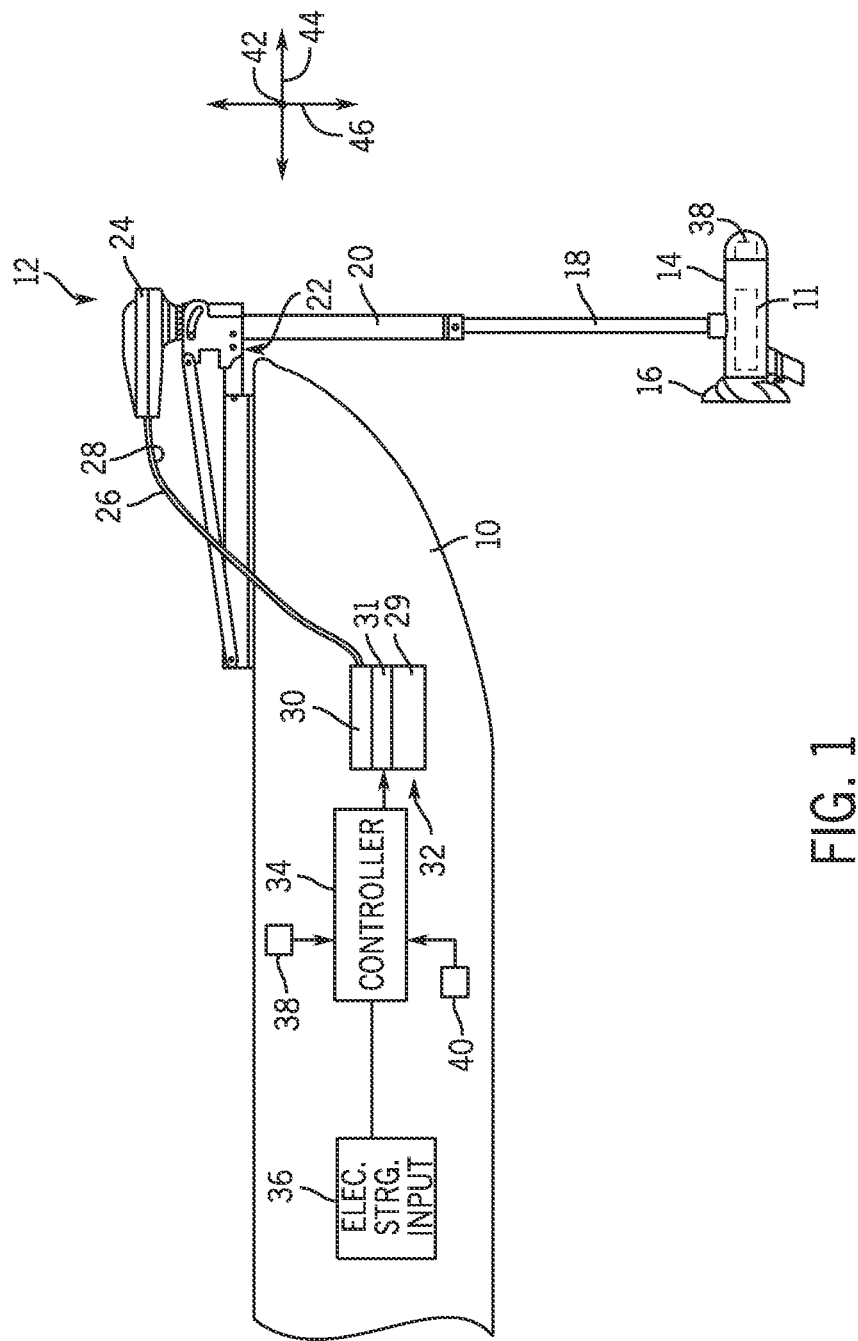
FIG. 1 illustrates a boat equipped with a steering system for an exemplary marine drive being a trolling motor.
Figure 2:
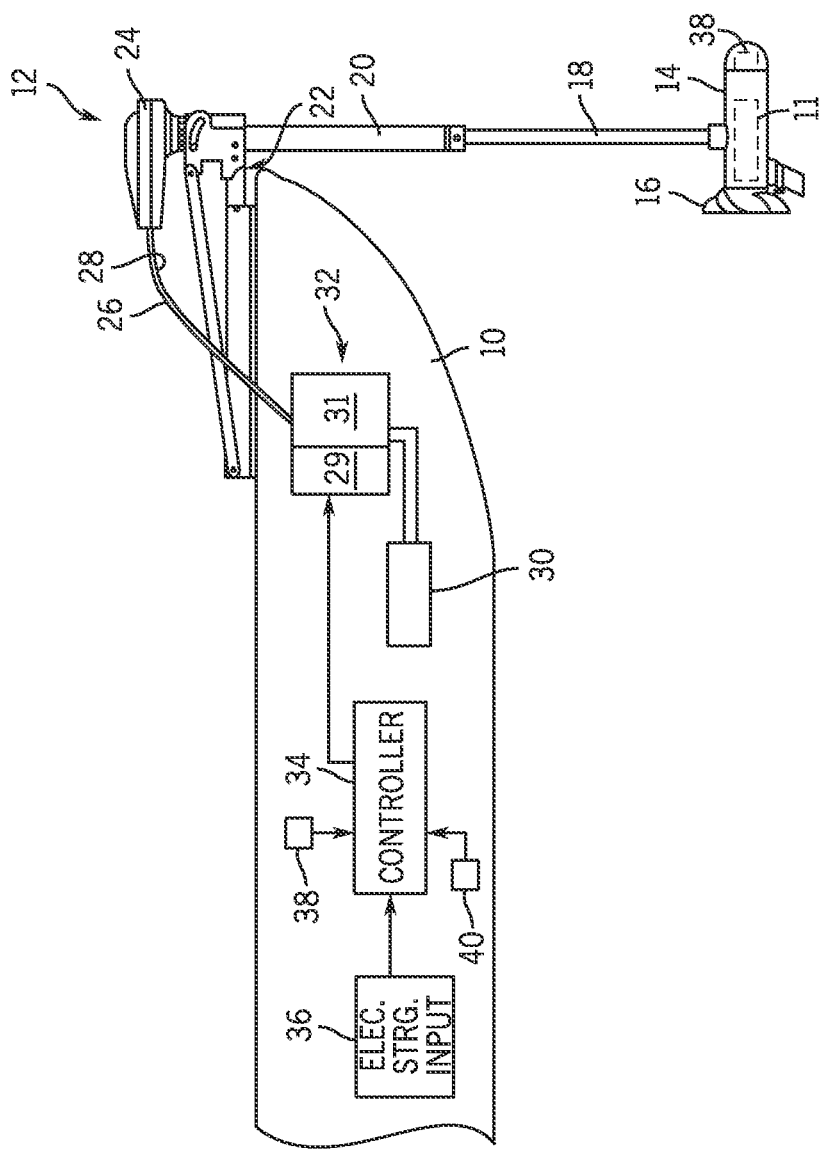
FIG. 2 illustrates a boat equipped with another example of a steering system for a trolling motor.

FIG. 1 illustrates a marine vessel or boat 10 equipped with a trolling motor system 12, which is an exemplary marine drive. As shown in the figure, the trolling motor system 12 is a bow-mounted system; however, the trolling motor system 12 could be provided elsewhere on the marine vessel 10. The trolling motor system 12 includes a trolling motor 14 having a propeller 16 rotatably driven by an electric motor 11. In one example, the electric motor 11 is a brushed DC electric motor that is directly connected to a shaft of the propeller 16. Although FIGS. 1 and 2 depict the marine drive of the marine vessel 10 as comprising a trolling motor system 12 having an electric motor 11, the systems and methods of the invention disclosed herein could be implemented with motors utilized for both propulsion and steering, and with many other types of marine drives, including inboard and outboard drives, inboard/outboard drives, stern drives, and the like, whether powered by an internal combustion engine, electric motor, or alternative fuel source.

The trolling motor 14 is connected to a steering shaft 18 rotatably received in a fixed shaft 20, which is mounted to the boat 10 by way of a mounting mechanism 22. The steering shaft 18 is rotationally fixed with respect to the trolling motor 14, and can be rotated within the fixed shaft 20 so as to control the orientation (and direction of thrust) of the trolling motor 14. The trolling motor system 12 further includes a trolling motor head 24 mounted at the top of fixed shaft 20. A mechanical linkage, such as a pair of cables 26, 28, extends from within the head 24 to a mechanical steering input device such as a foot pedal 30, which is provided at a location where an operator of the boat 10 can manipulate it with his foot to control steering of the trolling motor 14.

Together, the foot pedal 30, mechanical linkage (e.g. cables 26, 28), and steering shaft 18 make up a mechanical steering system for the boat 10. The mechanical steering system may also include other gears, pulleys, cables, etc. that may be provided to mechanically link the mechanical steering input device to the trolling motor system 12. In one example, the foot pedal 30, cables 26, 28, and steering shaft 18 are configured as a pull-pull cable system in which cable 26 is wound in one direction around a cable drum fixed to the top of steering shaft 18, and cable 28 is wound in an opposite direction around the cable drum. As will be described further herein below, pressing the foot pedal 30 in one direction will pull on cable 26, while pressing the foot pedal in an opposite direction will pull on cable 28. Due to the opposite windings of cables 26, 28 around the cable drum, pulling on cable 26 rotates steering shaft 18 within fixed shaft 20 in one direction, while pulling on cable 28 rotates steering shaft 18 within fixed shaft in an opposite direction. For example, if a foot pedal 30 is used as the mechanical steering input device, either a toe down or heel down movement of the foot pedal 30 would cause left or right steering of the trolling motor 14. Those having ordinary skill in the art should recognize that different types of mechanical steering input devices besides a foot pedal could be used to input manual steering commands to the left or right. Additionally, various other types of cabled connections from the mechanical steering input device to the steering shaft 18 could be made, and the configuration of the connections described herein is not limiting on the scope of the present disclosure.

FIG. 1 also illustrates an electromechanical actuation system 32 that is configured to be coupled to the foot pedal 30. The electromechanical actuation system 32 may comprise an electric motor assembly 29 (including, for example, an electric motor, gear box, and/or output shaft) and a mechanical coupling device 31 (such as, for example, a clutch, selector ring, or other type of torque-transmitting interface) for coupling the electric motor assembly 29 to the foot pedal 30. The electromechanical actuation system 32 is in signal communication with a controller 34. The controller 34 provides steering signals to the electromechanical actuation system 32 as will be described further herein below. As will also be described below, the electromechanical actuation system 32 can be used to selectively actuate the foot pedal 30 so as to rotate the steering shaft 18 according to the steering signals provided by the controller 34.

The controller 34 may include a programmable processor and programmable input/output peripherals. As is conventional, the processor can be communicatively connected to a computer readable medium that includes volatile or non-volatile memory upon which computer readable code is stored. The processor can access the computer readable code on the computer readable medium and upon executing the code, carries out various functions of the trolling motor system 12. Controller 34 can be in wired or wireless signal communication with the electromechanical actuation system 32. The controller 34 may be located as shown in the figure, may be located in the trolling motor head 24, or at any other suitable location aboard the boat 10. In an exemplary embodiment, the controller 34 receives input from a current sensor, configured to measuring the current flowing through the motor 11, such as a current sense resistor and amplifier. Further details of such an arrangement are included in U.S. Pat. No. 6,507,164, incorporated by reference herein in its entirety.

Also included in FIG. 1 is an electrical steering input device 36. The electrical steering input device 36 could comprise one or more of many different input devices, such as but not limited to a remote control device (wired or wireless), an autopilot, a GPS-equipped mapping device such as a chart plotter or fish finder, a depth finder, or any other device capable of accepting and/or generating steering commands for input to the controller 34. In this way, the controller 34 can be operated in an automatic navigation mode in response to input from the electrical steering input device 36. For example, the steering signals might be generated according to an electronic anchoring mode in order to keep the boat 10 at a selected geographical location in the water despite the presence of wind, waves, or other external influences that might tend to move the boat 10 from the selected position. In another example, the steering signals might be used to operate the trolling motor 14 in a waypoint tracking mode, in which the boat 10 is steered along a route of preselected geographical coordinates.

The boat 10 is therefore equipped with a mechanical steering system that includes a mechanical steering input device, such as the foot pedal 30, and a mechanical linkage (e.g. cables 26, 28) extending from the mechanical steering input device to the steering shaft 18 of the trolling motor 14. In another example, the mechanical steering input device might be a hand-held tiller, and the mechanical linkage might be a shaft that connects the hand tiller to the steering shaft 18. Movement of the mechanical steering input device causes movement of the mechanical linkage, which in turn causes rotation of the steering shaft 18. The boat 10 also includes an electromechanical actuation system 32 configured to be coupled to the mechanical steering system and a controller 34 in signal communication with the electromechanical actuation system 32 for providing steering signals thereto. In one example, the steering signals are input via the electrical steering input device 36. According to the present disclosure, the electromechanical actuation system 32 selectively actuates the mechanical steering system so as to rotate the steering shaft 18 according to the steering signals provided by the controller 34. As shown in FIG. 1, the electromechanical actuation system 32 can be provided near the foot pedal 30, and can actuate the foot pedal 30 itself.

In an alternative example, as shown in FIG. 2, the electromechanical actuation system 32 may be provided remotely from the foot pedal 30, and may actuate the mechanical linkage (here, the cables 26, 28) directly, instead of actuating the mechanical steering input device, which in turn actuates the mechanical linkage. In this example, the electromechanical actuation system 32 also includes an electric motor assembly 29, for example an electric motor and a gearbox with an output shaft. When the electric motor assembly 29 is coupled to the mechanical steering system by way of a mechanical coupling device 31, the electric motor assembly 29 actuates the cables 26, 28, which in turn rotate the steering shaft 18. A spool and additional cables could be provided to make the connection between the output shaft and the cables 26, 28. In other alternative examples, although not shown herein, the electromechanical actuation system 32 may be provided at the steering shaft 18 of the trolling motor 14 and may directly actuate the steering shaft 18. In this case, a geared motor coupled to the steering shaft 18 could be used. The purpose and function of the controller 34, electrical steering input device 36, and trolling motor system 12 in FIG. 2 are the same as in FIG. 1.

As described above, the foot pedal 30 may actuate the cables 26, 28 to thereby rotate the steering shaft 18, which steers the trolling motor 14 and changes the direction of thrust provided by the propeller 16. The electromechanical actuation system 32 may actuate the foot pedal 30 (FIG. 1), the cables 26, 28 (FIG. 2), or, most preferably, the steering shaft 18 directly so that the trolling motor 14 may be steered according to steering signals sent from the controller 34 to the electromechanical actuation system 32. This allows a boat 10 equipped with a traditional mechanical steering system to be controlled based on electrical signals from an electrical steering input device 36.

Still referring to FIGS. 1 and 2, the controller 34 is further shown to be in wired or wireless signal communication with one or more accelerometers 38, and a direction sensor 40, such as a compass, that indicates the vessel heading or facing direction of the bow. As described in further detail below with reference to FIGS. 3-6, data from the one or more accelerometers 38 and the direction sensor 40 may be utilized to detect and classify errors in a commanded heading of the vessel 10. In an exemplary embodiment, the one or more accelerometers 38 may be triaxial accelerometers configured to respectively measure acceleration data along each of x, y, and z axes such that acceleration data along the port-starboard, bow-stem, and vertical directions of the marine vessel can be measured. For example, the x-axis may be aligned along the port-starboard direction 42 of the vessel 10, while the y-axis may be aligned along the bow-stern direction 44, and the z-axis may be aligned along the vertical direction 46. However, in other embodiments, the orientation of the x-, y-, and z-axes of the triaxial accelerometer may be known relative to the port-starboard, bow-stem, and vertical directions, but they may not be aligned with those directions. In still further embodiments, single or dual axis accelerometers, gyroscopes, magnetometers, and strain gauges may be utilized in place of or in addition to the triaxial accelerometer(s). Alternatively, sensor fusion techniques incorporating data from other types of sensors may be utilized to determine acceleration about various directions of the marine vessel in place of or in addition to sensors configured to directly measure acceleration. The accelerometers or other sensors configured to measure acceleration data may be mounted in any suitable location on the boat 10, including internal spaces of the trolling motor 14 or within an external casing component of the trolling motor 14. In some embodiments, the accelerometers or other sensors may be located within an operator's mobile device (e.g., a phone, a tablet) if the mobile device is in wired or wireless signal communication with the controller 34.

Figure 3:
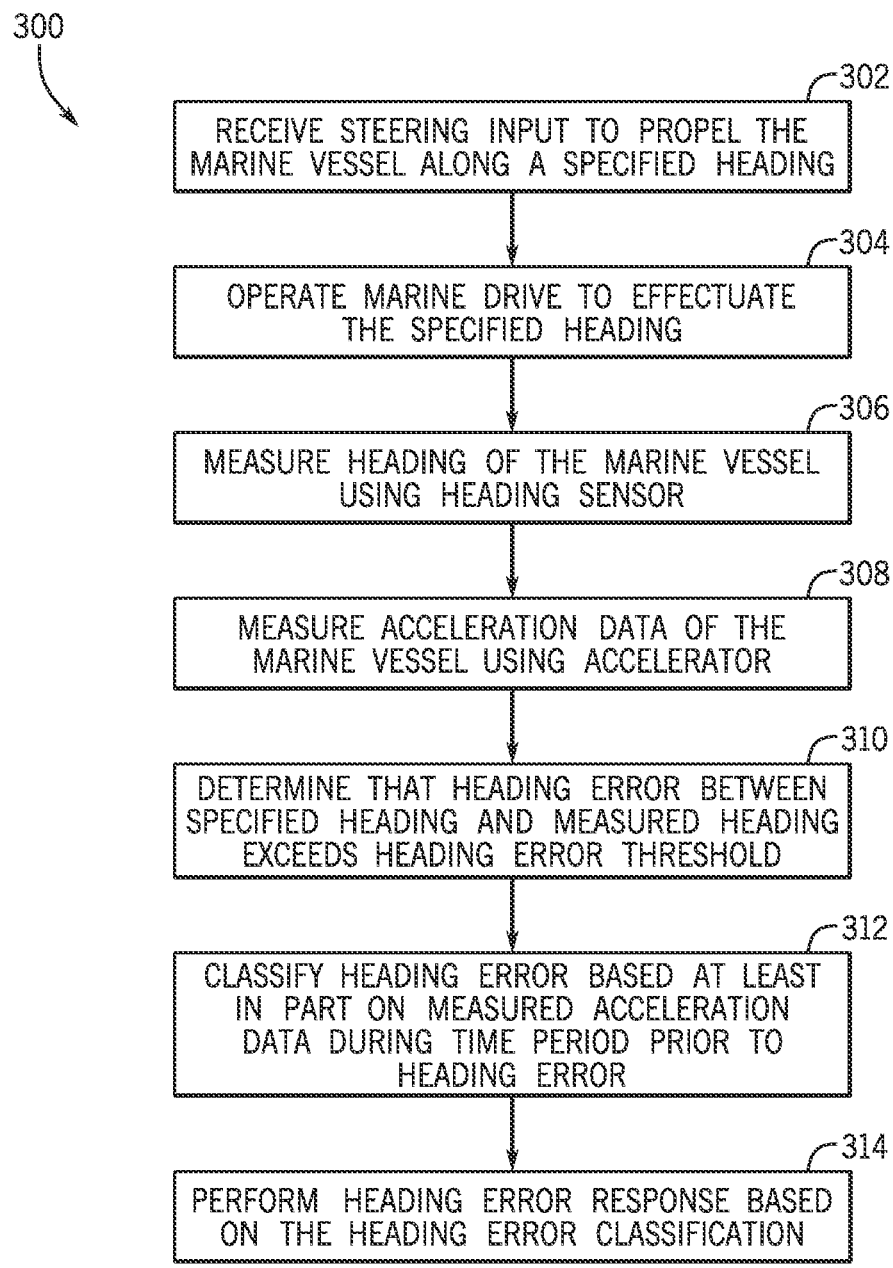
FIGS. 3 and 4 are flowcharts depicting exemplary embodiments of methods of controlling marine drives.

Referring now to FIG. 3, an exemplary method 300 for operating a marine drive (e.g., trolling motor system 12) is depicted. In an exemplary embodiment, method 300 is performed predominantly by controller 34 (see FIGS. 1 and 2). Method 300 commences at step 302, as the controller 34 receives a steering input to propel the vessel 10 along a specified heading. As described above with reference to FIGS. 1 and 2, the steering input received at the controller 34 may either be manually commanded by an operator or automatically generated by a navigation system. At step 304, the controller 34 operates the trolling motor system 12 to effectuate the specified heading. For example, the electromechanical actuation system 32 may actuate the foot pedal 30 (FIG. 1), the cables 26, 28 (FIG. 2), or the steering shaft 18 so that the trolling motor 14 is steered according to steering signals sent from the controller 34 to the electromechanical actuation system 32.

At steps 306 and 308, the controller 34 receives heading data measurements from the direction sensor or compass 40, and acceleration data measurements from one or more sensors (e.g., accelerometers 38). Such measurements may be performed generally continuously and simultaneously while the vessel 10 is operational. The controller 34 utilizes a Proportional-Integral-Derivative (PID) control algorithm that is configured to drive any error between a specified heading and a measured heading to zero. Accordingly, continuing with step 310, the controller 34 determines that an error between the specified heading received at step 302 and the measured heading received at step 306 exceeds a heading error threshold (e.g., 5 degrees). The heading error threshold may vary based on the characteristics of the vessel 10 and its propulsion system, the environmental conditions surrounding the vessel 10 (e.g., current strength, wind speed) and operator preference.

Method 300 continues as the controller 34 classifies the heading error detected at step 310 based at least in part on the acceleration data measurements (both magnitude and direction) received from the accelerometers 38 at step 308 during the time period associated with the heading error, such as the time period leading up to a detected peak heading error (e.g., 1 second prior). For example, an inability to achieve a commanded heading may be due to the trolling motor 14, propeller 16, and/or steering shaft 18 striking an object (e.g., a log, a stump, a rock, weeds, a seabed) in the body of water in which in the marine vessel 10 is located. Such events may be classified by the controller 34 as object strike events. In other cases, environmental conditions (e.g., a strong current or strong winds) may impede the trolling motor 14 from achieving the commanded heading. Such events may be classified as environmental-based events.

The controller 34 may distinguish between object strike heading error events and environmental-based heading error events based at least in part on acceleration data measured by one or more sensors (e.g., accelerometers 38). For example, if the propeller 16 strikes a rock in the body of water in which the vessel 10 is located, the impact will cause increases in measured G forces at the time of impact. If the magnitude or slope of the changes in acceleration exceeds certain specified thresholds, the controller 34 will categorize the heading error event as an object strike. In some instances, the controller 34 may further take the orientation of the acceleration spike into account when classifying a heading error event. For example, an object strike may be more likely to cause acceleration spikes in a direction parallel to the body of water (i.e., along the port-starboard 42 or bow-stern 44 directions of the marine vessel 10) rather than perpendicular to the body of water (i.e., along the vertical direction 46). By contrast, if the heading error is caused by an environmental-based event, for example, a strong wave, an increase in acceleration may be measured perpendicular to the body of water, along the vertical direction 46. In still further embodiments, the commanded steering direction may also be utilized in conjunction with the measured acceleration data to distinguish between object strike and environmental-based events. For example, if a steering command is to turn the vessel towards the port direction and a large increase in acceleration is measured by accelerometers 38 in the starboard direction, the controller 34 may determine that an object strike event has occurred.

In some embodiments, the controller 34 may further utilize the behavior of the input current to a steering motor (e.g., motor 11) or a propulsion motor to distinguish between object strike heading error events and environmental-based heading error events. For example, an object strike event may result in a spike in input current (see FIG. 7), such that the magnitude of the change in current or the slope of the increase in current exceed certain specified current thresholds. By contrast, an environmental-based heading error event may result in a slower or smaller increase in input current to the motor 11. In still further embodiments, the controller 34 may utilize machine learning techniques to classify types of heading errors, in place of or in addition to acceleration and current-based thresholds. For example, a machine learning model may be trained on acceleration and/or current data from numerous object strike and environmental-based heading error events such that features in the acceleration and/or current data indicative of an object strike event or an environmental-based event can be utilized during the classification process at step 312.

Figure 4:
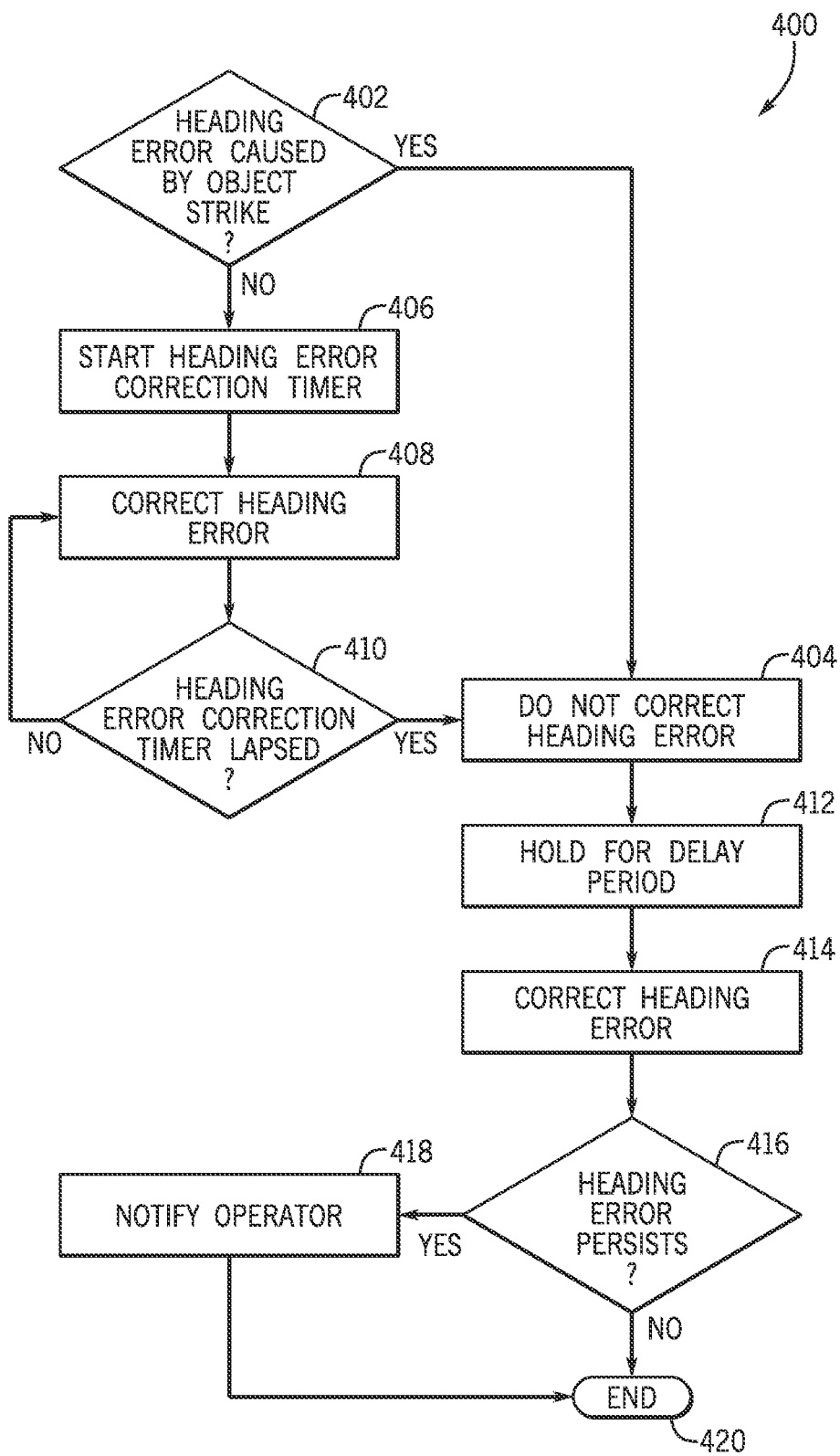

Method 300 concludes as the controller 34 performs a heading error response based on the heading error classification determined in step 312. An exemplary method 400 for performing a heading error response is shown and described below with reference to FIG. 4. FIG. 4 commences at step 402, as the controller 34 determines whether the heading error is caused by an object strike event. If, based on the acceleration data received at the controller 34, the controller 34 classifies the heading error due to an object strike, method 400 advances to step 404, and the controller 34 does not operate the trolling motor system 12 to effectuate the specified heading. For example, the controller 34 may stop sending signals to the electromechanical actuation system 32 to actuate the foot pedal 30 (FIG. 1), the cables 26, 28 (FIG. 2), or the steering shaft 18 to steer the trolling motor 14. This is because continued efforts to steer the trolling motor 14 to a specified heading in the presence of an obstacle may cause significant damage to the trolling motor system. 12. Accordingly, in some embodiments, step 404 may further include the controller 34 not changing a steering angle of a marine drive and/or stopping a thrust output of the marine drive (either immediately or at a predetermined ramp down rate), or the controller 34 transmitting a message notifying an operator of the presence of the object, thus permitting the operator to remove or manually steer away from the object.

If, however, at step 402, the controller 34 determines that the heading error cannot be attributed to an object strike event, the controller 34 may classify the heading error as an environmental-based event and method 400 may proceed to step 406. At step 406, the controller 34 may start a heading error correction timer, and at step 408, the controller 34 operates the trolling motor system 12 to effectuate the specified heading. Process 400 then proceeds to step 410, as the controller 34 determines whether the heading error correction timer has lapsed. In some embodiments, the heading error correction timer may lapse after a period ranging from 2-5 seconds. If the heading error correction timer has not yet lapsed, process 400 reverts to step 408, and the controller 34 continues to attempt to correct the heading error. If, however, the heading error correction timer has lapsed at step 410, process 400 reverts to step 404 and the controller 34 stops attempting to correct the heading error to minimize stress on the trolling motor system 12. Although such timers may be utilized in existing control methods for steering trolling motor systems, the present inventors have recognized that limiting the correction of heading errors to only certain types of classified heading errors (i.e., environmental-based heading errors) minimizes the risk of damage and provides a more desirable and responsive system by avoiding the increased noise and motion that would otherwise occur when a controller attempts to correct a heading error caused by an object strike.

In some embodiments, process 400 terminates at step 404 after an object strike event is detected, or when an environmental-based event cannot be corrected within a period of time determined by a heading error correction timer. However, in other embodiments, method 400 continues with step 412 as the system holds for a specified delay period to minimize potential stress on the trolling motor system 12 and permit time for the boat 10 to move away from an obstacle. Once the delay period has elapsed, the controller 34 again attempts to correct the heading error at step 414 by operating the trolling motor system 12 to effectuate the specified heading, and at step 416 the controller 34 determines whether the heading error persists. If so, process 400 advances to step 418 and the controller 34 may transmit a message informing the operator of the persistence of the heading error before process 400 terminates at step 420. In some embodiments, step 418 further includes the controller 34 slowing or stopping the trolling motor 14. If, however, the controller 34 determines that the heading error has been corrected at step 416, process 400 advances and terminates at step 420.

Figure 5:
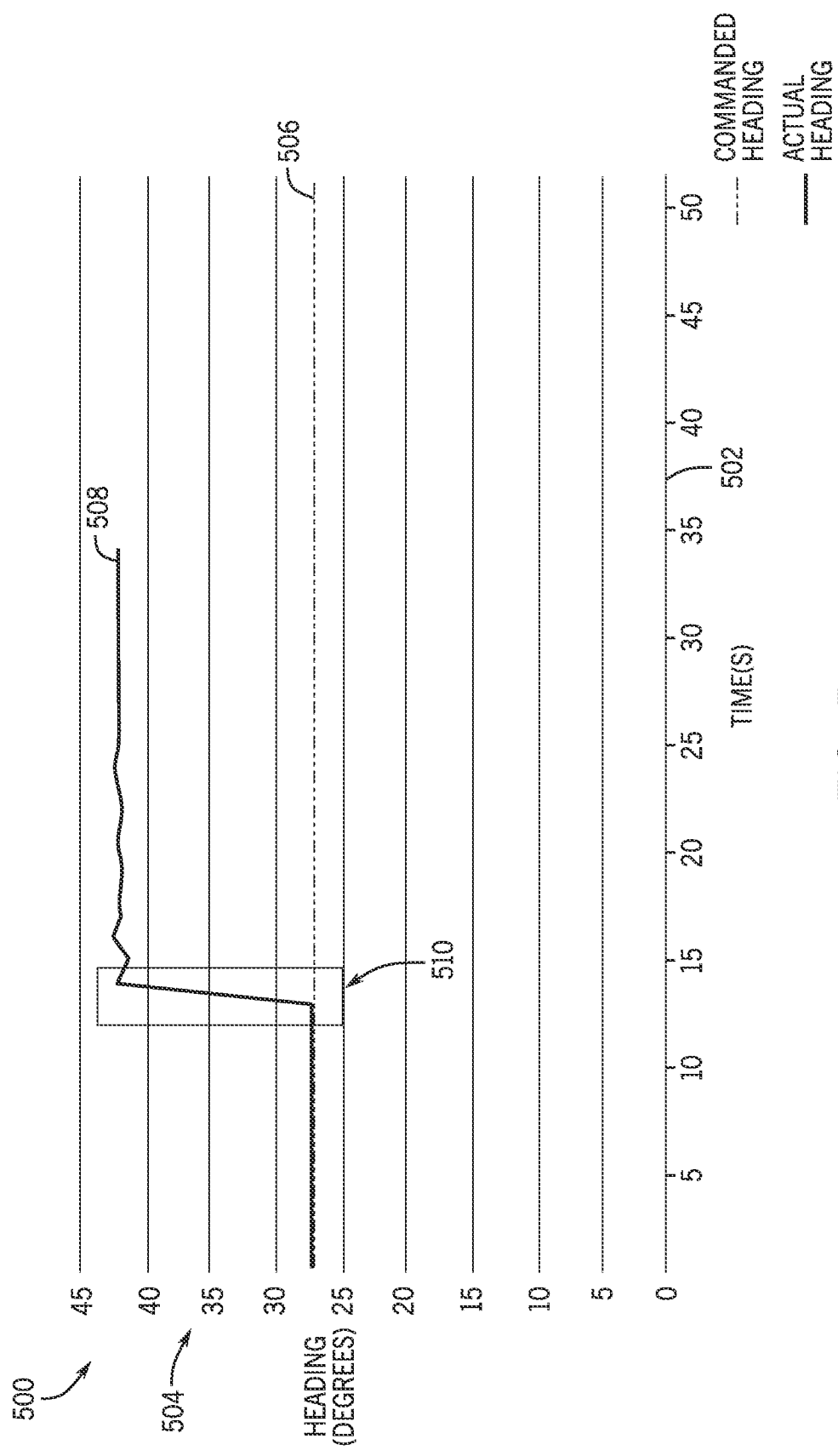
FIG. 5 is an exemplary plot depicting heading data responsive to an object strike event.
Figure 6:
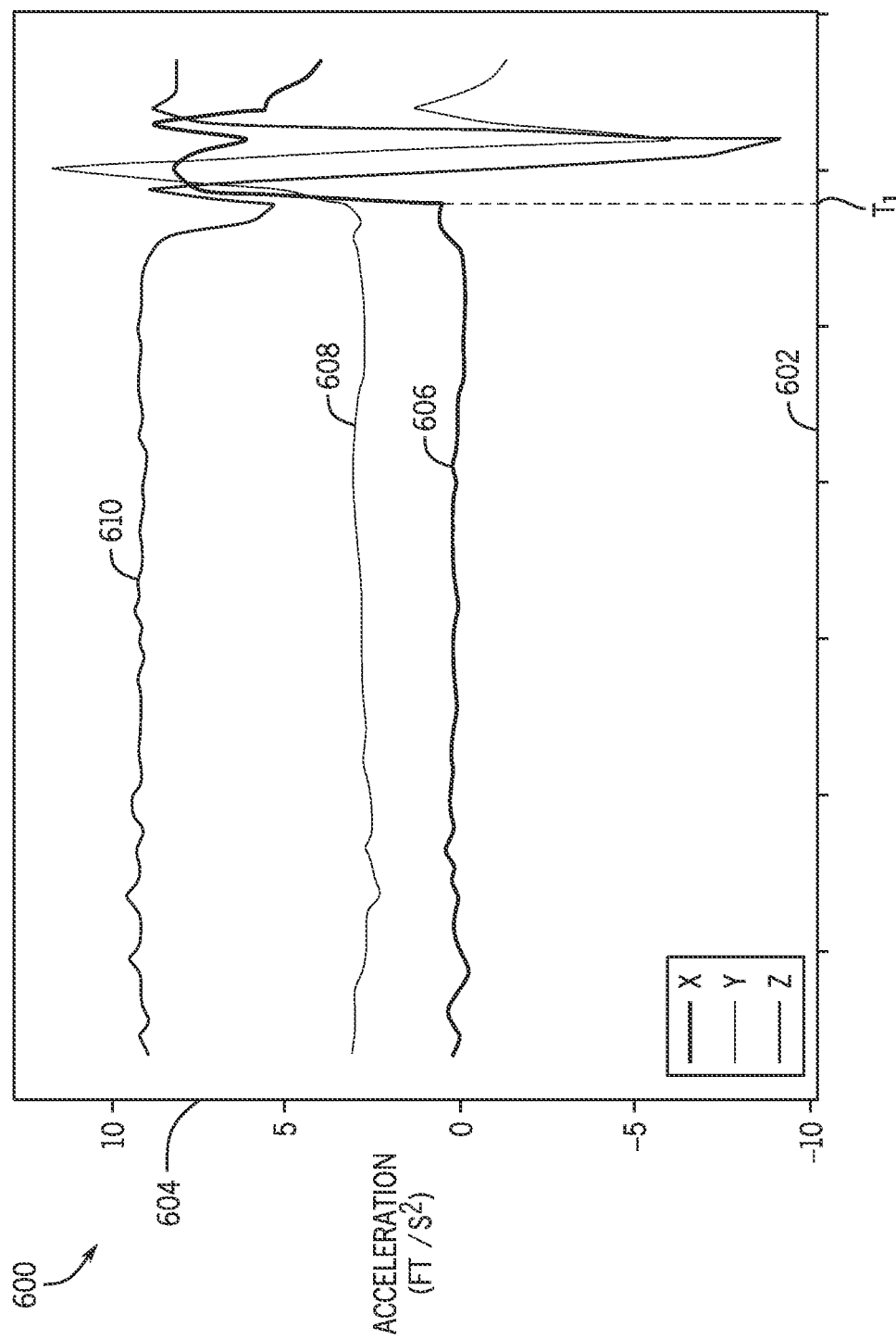
FIG. 6 is an exemplary plot depicting triaxial accelerometer data responsive to an object strike event.

FIGS. 5 and 6 are plots depicting exemplary data that may be measured by accelerometers 38 and direction sensor 40 for the purpose of detecting and classifying heading errors according to the methods described above. FIG. 5 is an exemplary plot depicting a commanded and measured heading over time. Specifically, time t in seconds is depicted on x-axis 502, while heading in degrees is depicted on y-axis 504. Heading, as commanded either manually by an operator or automatically by a navigation system is shown by trendline 506, while measured heading as sensed by the direction sensor or compass 40 is shown by trendline 508.

As shown, prior to approximately t=14 seconds, the actual or measured heading 508 matches the commanded heading 506 of 27 degrees. However, between t=14 s and t=16 s, within region 510, the measured heading 508 of the vessel 10 increases to approximately 42 degrees. In various embodiments, a controller 34 may utilize heading error thresholds regarding the magnitude of the heading error (in this case, approximately 15 degrees) and/or the slope or speed of the change in heading (in this case, approximately 7.5 degrees/second) at step 310 of method 300 (see FIG. 3) when determining that a heading error necessitating response and heading error classification is present.

FIG. 6 is an exemplary plot 600 depicting measured acceleration data from a triaxial accelerometer over time during an object strike event. Specifically, time is depicted on the x-axis 602, while acceleration magnitude (e.g., in units of ft/s$^2$) is depicted on y-axis 604. As plot 600 depicts triaxial acceleration data, acceleration about the x-axis (i.e., the port-starboard direction of the vessel 10) is represented by trendline 606, acceleration about the y-axis (i.e., the bow-stern direction of the vessel 10) is represented by trendline 608, and acceleration about the z-axis (i.e., the vertical direction of the vessel 10) is represented by trendline 610. As shown, after time t1, the accelerometer measures large spikes in acceleration of the vessel 10, particularly about the y-axis indicated by trendline 608 and the z-axis indicated by trendline 610. Based on the magnitudes of the changes in acceleration about certain axes or the speed of such changes exceeding certain acceleration thresholds, the controller 34 will classify the event as an object strike event as opposed to an environmental-based event at step 312 of method 300.

Figure 7:
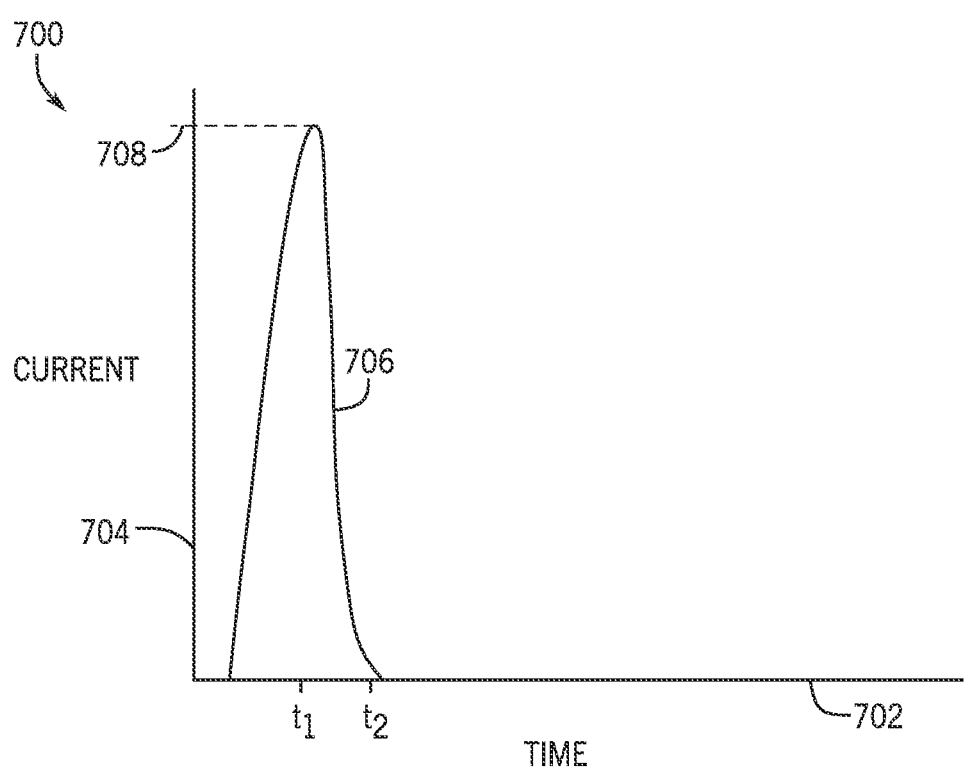
FIG. 7 is an exemplary plot depicting motor current data responsive to an object strike event.

FIG. 7 is an exemplary plot 700 depicting measured input current data (represented by trendline 706) for a steering or propulsion motor during an object strike event. Specifically, time is depicted on the x-axis 702, while input current magnitude is depicted on y-axis 704. As shown, the input current increases very quickly before reaching a maximum input current value 708 at time t1, and quickly decreases back to a minimum input current value at time t2. As described above, in various embodiments, the magnitude of the maximum current value, the magnitude of the change in current and/or the slope of the increase in current exceeding certain specified current thresholds may be utilized by the controller 34 to identify an object strike event.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method of operating a marine drive configured to propel a marine vessel, the method comprising:
   operating the marine drive to effectuate a specified heading based on a steering input;
   measuring a heading of the marine vessel using a heading sensor;
   measuring acceleration data of the marine vessel using at least one sensor:
   determining, by a processor, that a heading error between the specified heading and the measured heading exceeds a heading error threshold;
   classifying the heading error based at least in part on the measured acceleration data during a time period associated with the heading error exceeding the threshold; and
   performing a heading error response based on the heading error classification.

2. The method of claim 1, wherein tie heading error classification is an object strike event.

3. The method of claim 2, wherein the heading error response comprises not correcting the heading error for at least a predetermined period of time.

4. The method of claim 3, wherein not correcting the heading error comprises at least one of not changing a steering angle of the marine drive, steering the marine drive away from an object, and stopping a thrust output of the marine drive.

5. The method of claim 2, wherein:
the at least one sensor is a 3-axis accelerometer configured to measure acceleration data along the port-starboard, bow-stern, and vertical directions of the marine vessel; and
the obstacle-based heading error classification is based on a measured acceleration value along the port-starboard direction or the bow-stern direction exceeding an acceleration threshold.

6. The method of claim 1, wherein the heading error classification is an environmental-based event caused by wind or current conditions surrounding the marine vessel.

7. The method of claim 6, wherein the heading error response comprises automatically controlling steering and/or propulsion of the marine drive to correct the heading error.

8. The method of claim 7, wherein the heading error response comprises stopping correction of the heading error responsive to a determination that a heading error correction time has lapsed.

9. The method of claim 6, wherein:
the at least one sensor is a 3-axis accelerometer configured to measure acceleration data along the port-starboard, bow-stern, and vertical directions of the marine vessel; and
the environmental-based heading error classification is based on a measured acceleration value along the vertical direction exceeding an acceleration threshold.

10. The method of claim 1, wherein the heading error threshold comprises at least one of a threshold magnitude of error between the commanded heading and the measured heading and a threshold rate of change in the measured heading.

11. The method of claim 1, wherein the marine drive contains an electric motor, and the method further comprises:
measuring an input current supplied to the electric motor; and
classifying the heading error further based at least in part on the input current measurement.

12. The method of claim 11, wherein the electric motor comprises a steering motor.

13. A marine propulsion system comprising:
a marine drive configured to propel a marine vessel;
a heading sensor configured to detect a heading of the marine vessel;
at least one sensor used to determine acceleration of the marine vessel along at least one axis; and
a control system configured to:
operate the marine drive to effectuate the specified heading;
measure a heading of the marine vessel using the heading sensor;
measure acceleration data of the marine vessel using the at least one sensor;
determine that a heading error between the specified heading and the measured heading exceeds a heading error threshold;
classify the heading error based at least in part on the measured acceleration data during a time period prior to the heading error; and
perform a heading error response based on the heading error classification.

14. The system of claim 13, wherein the heading error classification is an object strike event.

15. The system of claim 14, wherein the heading error response comprises not correcting the heading error for at least a predetermined period of time.

16. The system of claim 15, wherein not correcting the heading error comprises at least one of not changing a steering angle of the marine drive, steering the marine drive away from an object, and stopping a thrust output of the marine drive.

17. The system of claim 14, wherein:
the at least one sensor is a 3-axis accelerometer configured to measure acceleration data along the port-starboard, bow-stern, and vertical directions of the marine vessel; and
the obstacle-based heading error classification is based on a measured acceleration value along the port-starboard direction or the bow-stern direction exceeding an acceleration threshold.

18. The system of claim 13, wherein the heading error classification is an environmental-based event caused by wind or current conditions surrounding the marine vessel.

19. The system of claim 18, wherein the heading error response comprises correcting the heading error.

20. The system of claim 19, wherein the heading error response comprises stopping correction of the heading error responsive to a determination that a heading error correction time has lapsed.

21. The system of claim 18, wherein:
the at least one sensor is a 3-axis accelerometer configured to measure acceleration data along the port-starboard, bow-stern, and vertical directions of the marine vessel; and
the environmental-based heading error classification is based on a measured acceleration value along the vertical direction exceeding an acceleration threshold.

22. The system of claim 13, wherein the heading error threshold comprises at least one of a threshold magnitude of error between the commanded heading and the measured heading and a threshold rate of change in the measured heading.

23. The system of claim 13, wherein the marine drive contains an electric motor, and the control system is further configured to:
measure an input current supplied to the electric motor; and
classify the heading error further based at least in part on the input current measurement.

24. The system of claim 23, wherein the electric motor comprises a steering motor.

* * * * *